United States Patent Office.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

PROCESS OF DEODORIZING TANK-WATER.

SPECIFICATION forming part of Letters Patent No. 362,235, dated May 3, 1887.

Application filed July 27, 1885. Serial No. 172,844. (No model.)

*To all whom it may concern:*

Be it known that I, JOSEPH VAN RUYMBEKE, a citizen of Belgium, residing at Chicago, in the county of Cook and State of Illinois, have invented certain new and useful Improvements in Process of Complete Deodorization of Tank-Waters, which are fully set forth in the following specification.

Tank-waters from slaughter-houses, bone-boiling, fat-rendering, and other analogous establishments possess a very offensive odor, and the chief object of my invention is to render such tank-water inodorous, and to prevent or check putrefaction. These tank-waters often contain meat-trimmings, fat, pieces of skin, intestines, and other animal-matters already commencing to putrefy.

In carrying out my process these tank-waters, with the solid matters therein, are placed in closed vessels and there submitted to the action of water under a steam-pressure of about forty pounds, whereby is extracted the soluble portions of the albuminoids contained in these substances. By the same action of water and steam-pressure portions of the albuminoids are partly decomposed, and, together with the natural flavors of the various meaty and other substances, give a disagreeable odor and taste to the resultant liquids, which are technically known as "tank-waters." The only attempts made to use these liquids have been for making fertilizers, which use rendered deodorization unnecessary, and, so far as known, it has not been done, and, as there are no other liquids having similar properties, processes of disinfecting sewage would not be applicable to tank-waters. The complex nature of these tank-liquids and of the objectionable flavors to be removed oftentimes makes necessary the use of a very complete process of deodorization, and in my experience I have found it most successfully accomplished by first preparing these liquids by successive acidulation and neutralization, followed by oxidation, and completing the process by the action of absorbents; but some tank-waters and their contained substances will not require as complete a treatment as the above, and sometimes the oxidation or the action of the absorbents or the successive acidulation and neutralization may prove sufficient.

In carrying out my invention, whenever practicable I secure these liquids direct from the rendering-tanks before they have cooled, thus preventing putrefaction, and their heated condition is continued until the process of deodorization is complete. To further decompose the products of decomposition proceeding from the albuminoids and to change them into compounds that will oxidize more readily, I first add to these tank-waters less than one-fifth of one per cent. of mineral acid, (preferably sulphuric,) which is allowed to act upon the liquids for about ten minutes, after which the acid is neutralized by the addition of alkaline earth or fixed alkalies. From this mixture the clear liquor is separated, preferably by decantation, and to the clear liquor is added a weak solution of permanganate in water, pure or acidulated with sulphuric acid, which, after the lapse of about ten minutes, is precipitated and neutralized by the addition of alkaline earth. Chromates, manganates, bichromates, and other peroxidized salts, which act like the permanganate, may be used as equivalents. The clear solution thus obtained is again separated, as before, and to it is added bone-black, (preferably dust or powder,) and the liquid brought to ebullition, when it is filtered. Other absorbents—such as ashes, alumina, magnesia, alum, or sulphate of aluminum with alkaline earth—may be used instead of bone-black. The final liquid thus obtained is then concentrated to a sirupy consistence, when it will be found entirely free from all noxious or animal flavors and easy of preservation.

What I claim as my invention is—

The within-described process of deodorizing tank-waters, consisting, first, of adding successively small quantities of an acid, then an alkali, and filtering or decanting, then treating the liquid by an oxidizing agent, as a permanganate and an alkaline earth, again separating the precipitate, and then heating with an absorbent, as bone-black, and finally filtering or decanting, as described.

JOSEPH VAN RUYMBEKE.

Witnesses:
WM. ZIMMERMAN,
WILLIAM F. JOBBINS.